United States Patent [19]

Develle et al.

[11] Patent Number: 4,961,764

[45] Date of Patent: Oct. 9, 1990

[54] FILTERING UNIT AND FILTERING EQUIPMENT INCORPORATING SAID UNIT

[75] Inventors: Guy Develle, Domont; Robert Chaperon, Meriel, both of France

[73] Assignee: Sofiltra Poelman, La Garenne Colombes, France

[21] Appl. No.: 311,273

[22] Filed: Feb. 15, 1989

[30] Foreign Application Priority Data

Feb. 19, 1988 [FR] France ................................ 88 01984

[51] Int. Cl.$^5$ ........................ B01D 50/00; B01D 53/04
[52] U.S. Cl. ......................................... 55/316; 55/318; 55/385.2; 55/387; 55/422; 55/473; 55/502
[58] Field of Search ................. 55/316, 318, 356, 359, 55/385.1, 385.2, 387, 422, 471-473, 502, 505-507, 509, 521, DIG. 33

[56] References Cited

U.S. PATENT DOCUMENTS

| | | | |
|---|---|---|---|
| 2,465,163 | 3/1949 | Lockwood | 55/387 X |
| 2,614,650 | 10/1952 | Chandler et al. | 55/387 X |
| 2,771,156 | 11/1956 | Kasten et al. | 55/502 X |
| 2,845,138 | 7/1958 | Gageby | 55/316 X |
| 2,987,175 | 6/1961 | Bottum | 55/387 X |
| 3,057,468 | 10/1962 | Allan, Jr. | 55/502 X |
| 3,240,567 | 3/1966 | Caparreli et al. | 55/387 X |
| 3,246,758 | 4/1966 | Wagner | 55/387 X |
| 3,656,625 | 4/1972 | Bottum | 55/387 X |
| 3,705,480 | 12/1972 | Wireman | 55/316 X |
| 3,816,984 | 6/1974 | Neumann | 55/502 |
| 3,870,492 | 3/1975 | Guild | 55/387 |
| 4,198,221 | 4/1980 | Catlin et al. | 55/502 X |
| 4,225,328 | 9/1980 | Stiehl | 55/502 X |
| 4,333,752 | 6/1982 | Thies et al. | 55/387 |
| 4,483,273 | 11/1984 | Develle et al. | 55/502 X |
| 4,514,198 | 4/1985 | Develle et al. | 55/337 |
| 4,548,624 | 10/1985 | Waller | 55/316 X |
| 4,684,381 | 8/1987 | Wasylyniuk | 55/502 X |
| 4,725,323 | 2/1988 | Ostreicher et al. | 55/502 X |
| 4,765,810 | 8/1988 | Wetzel | 55/502 X |
| 4,822,386 | 4/1989 | Duchesneau | 55/502 X |
| 4,828,590 | 5/1989 | Eckstein et al. | 55/316 |

FOREIGN PATENT DOCUMENTS

| | | |
|---|---|---|
| 2396580 | 2/1979 | France . |
| 2523275 | 9/1983 | France . |
| 53909 | 8/1967 | Luxembourg . |
| 491665 | 6/1970 | Switzerland . |

Primary Examiner—Robert Spitzer
Attorney, Agent, or Firm—Young & Thompson

[57] ABSTRACT

The invention relates to the filtration of air according to the N.B.C. method. A filtering unit (1) adapted to be incorporated in a casing of a filtering equipment comprises, in a housing, a filtering stage employing "filter paper" superimposed on a filtering stage based on "activated charcoal", an inlet passage (12) for gas to be filtered on the upstream side of the "paper" stage and a discharge passage (4) for filtered gas on the downstream side of the "charcoal" stage, one (12) of the passages being equipped with a peripheral sealed junction device (13,13') adapted to cooperate with a wall of the casing. The inlet and discharge passages (12,16) of the filtering unit are closed by sealed closure members (15,16) peripherally connected to the walls (7) of the housing and manually disengageable.

10 Claims, 5 Drawing Sheets

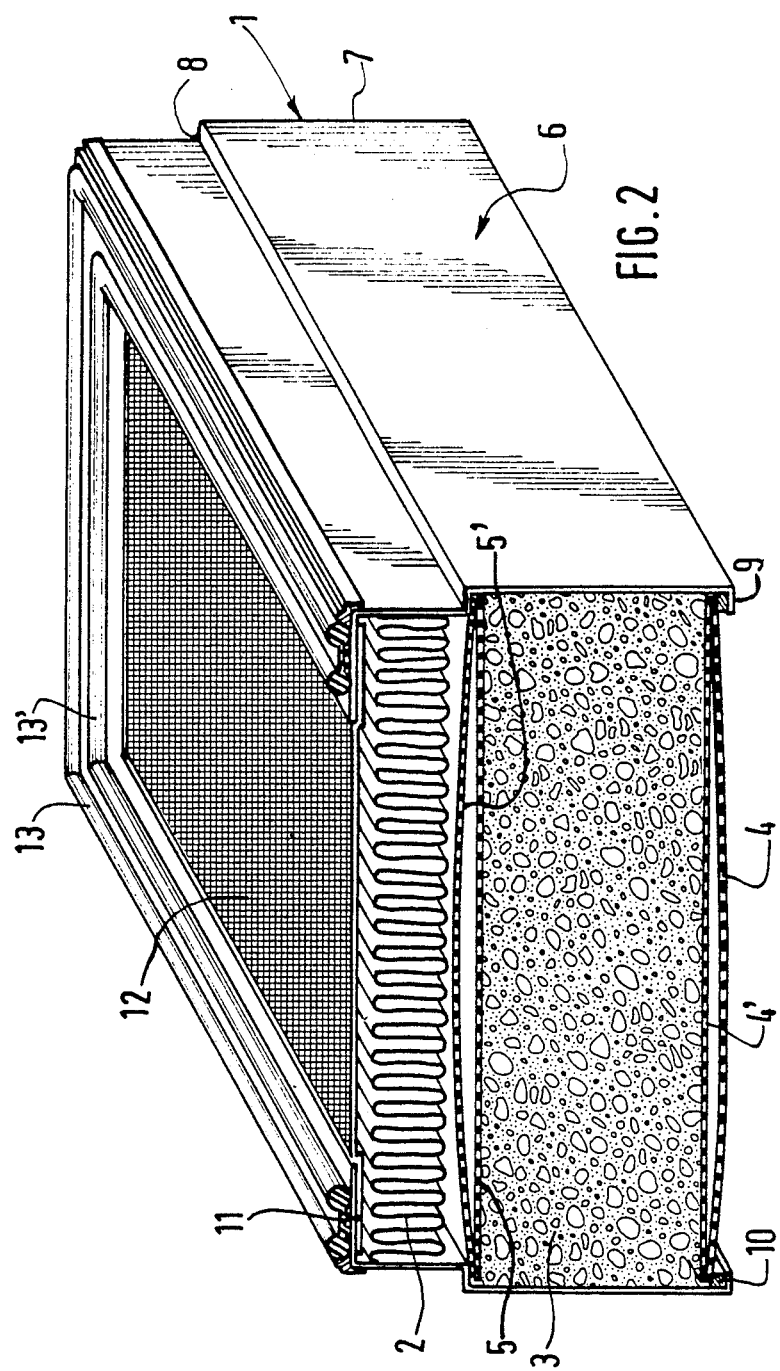

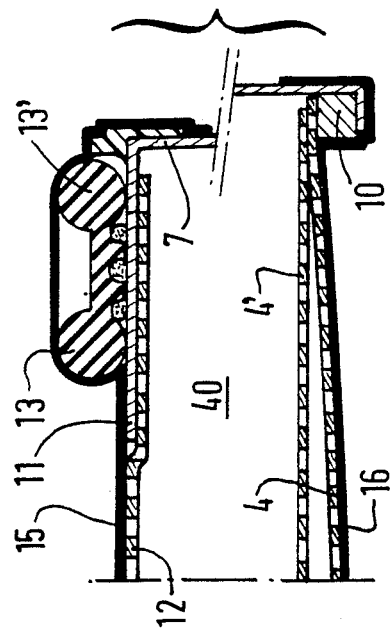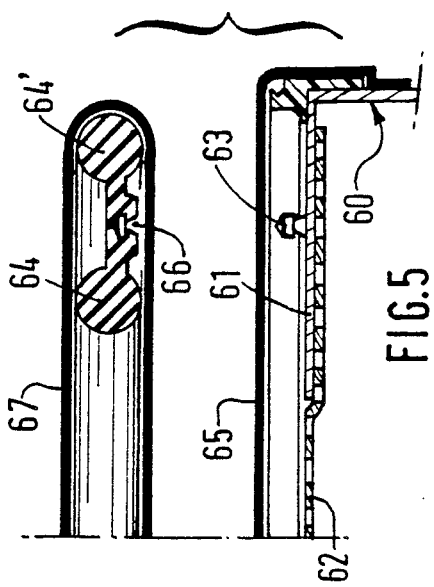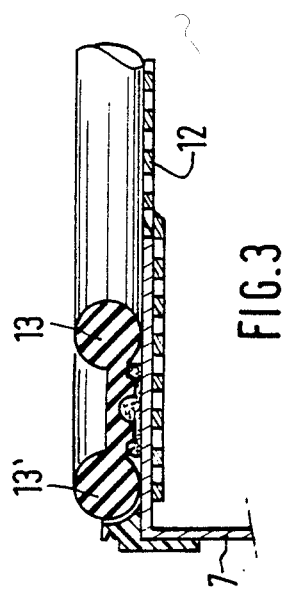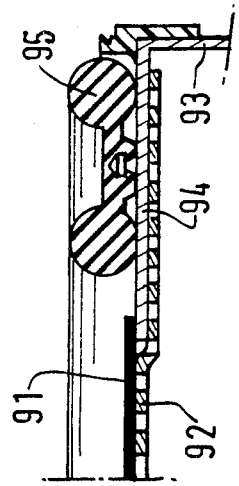

FILTERING UNIT AND FILTERING EQUIPMENT INCORPORATING SAID UNIT

The present invention relates to a filtering unit and to a filtering equipment incorporating said unit for supplying purified respiratory air to a confined compartment, for example carried on board a vehicle, providing isolation from the ambient atmosphere contaminated by nuclear and/or biological and/or chemical ("N.B.C") effects.

For this type of equipment, intended for rare use in the event of serious incidents which may occur without a prior warning on hazardous sites of intervention, the filtering unit must be maintained both in immediate proximity to the concerned compartments and sheltered from the surrounding air, which would in the long run tend to deteriorate the absorbent granulates, and, for this purpose, the filtering unit is isolated from the surrounding air by placing it in a sealed package of the type rapidly manually disengaged, and the filtering unit is placed in the normal operational receiving casing of a filtering equipment. In the event of danger, the compartment can be supplied with purified air by withdrawing the filtering unit from the casing which is accessible from within the compartment, by rapidly disengaging the package from the filtering unit and reintroducing the filtering unit in the active state in the casing and locking it in its operating position.

This manner of proceeding is satisfactory, since it requires no special storage arrangement within the compartment (apart from the sites for the storage of filtering units intended to replace those at the end of utilization) and the speed with which it is brought into action satisfies the unforeseeable suddeness of the contamination of the atmosphere.

The applicant has however imagined an improvement in this type of equipment by ensuring a smaller specific overall size and a simplification of the operating means. It originated from the observation that the atmospheric isolation package of the filtering unit resulted, on one hand, in a slight overdimensioning of the receiving casing, since the filtering unit in its package is placed therein in the standby position, and, on the other hand, in the necessity of means for locking the filtering unit in a double position in its casing, one corresponding to the standby position of the filtering unit enclosed within its package, and the other being the position in which the filtering unit is withdrawn from its package and therefore has a smaller overall size.

An object of the present invention is to strictly adapt the outside size of the filtering unit to the casing which acts as a compartment therefor and to simplify the means for locking the filtering unit in position in its compartment.

This double object is achieved, according to the invention, by the fact that the inlet and discharge passages of the filtering unit are closed by sealed closure members which are peripherally connected to the wall proper of the housing of the filtering unit and are manually disengageable. These closure members consequently form, in combination with the housing of the filtering unit, a sealed chamber for isolation from the surrounding air and, as these closure members are arranged to have a very small thickness, since they have no supporting function in contrast to the conventional package, the overall size of the filtering unit is substantially the same whether provided or not provided with said closure members. The dimensions of the receiving casings may then be slightly reduced, on one hand, and, on the other hand, the means for maintaining the filtering unit in a locked position in its casing are simplified, since they have only to ensure a single and unique locked position.

According to a particular embodiment, as the peripheral sealed junction means are of the type having an annular sealing element of elastic material, the sealed closure member of the passage associated with said sealing element extends beyond and overlaps said sealing element. According to a modification the sealing closure member of a passage extends within said peripheral annular sealing element without overlapping it.

According to a modification, the sealed junction means on the periphery of a passage comprising anchoring means for a detachable sealing element which is conserved in a standby function apart from the filtering unit, this elastic sealing element is individually placed in a manually disengageable sealing cover.

The invention also provides a filtering equipment and in particular an "N.B.C." filtering equipment, comprising a casing associated with ventilating means and adapted to incorporate a filtering unit having an inlet passage for air to be purified and a discharge passage for purified air, and means for maintaining said filtering unit in a locked position against an inner surface of a casing wall, with interposition of a sealing element, wherein said locked position maintaining means are adapted to ensure a single locking position.

Features and advantages of the invention will be apparent from the following description which is given by way of example with reference to the accompanying drawings, in which:

FIG. 2 is a view identical to FIG. 1 with the filtering unit ready for use.

FIGS. 3 and 4 are enlarged partial views of FIGS. 2 and 1 respectively.

FIGS. 5 and 6 are views of two modifications.

Figure 1:
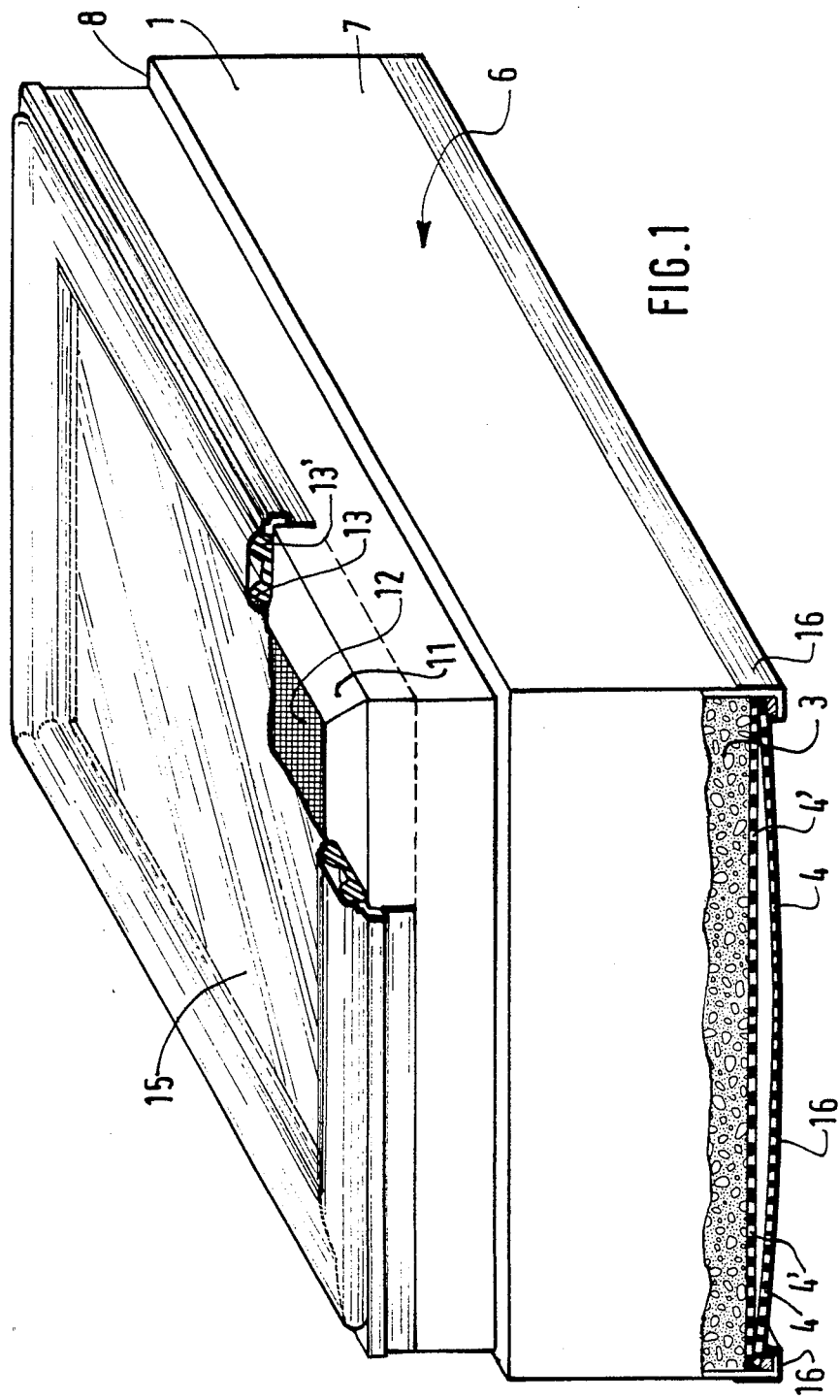
FIG. 1 is a perspective view of a filtering unit in a standby condition.

With reference to FIGS. 1 to 4, a filtering unit 1 is constituted by two superimposed filtering stages, namely a stage 2 constituted by folded filter paper, another stage 3 constituted by absorbent granulates maintained clamped between a perforated double bottom 4, 4' and a perforated double lid 5, 5'.

The filtering stages 2 and 3 are maintained in a housing 6 mainly comprising a lateral wall 7 having a step 8 for constituting a support for the lid 5' and having an inwardly extending lower flange 9 constituting a lower support for the packing block 10 for the bottom 4. Note that the step also acts as a foolproof means for avoiding the introduction of the filter the wrong way round.

This lateral wall 7 further comprises, above the "paper" stage, a wide inwardly extending flange 11 against the inner surface of which is fixed a perforated panel 12 constituting a gas passage. Mounted on this flange 11 is an annular double sealing element 13, 13'.

In this standby state before a first utilization, the filtering unit is sealed off from the surrounding atmosphere by the sealed fixing (adhesion or welding) of a closure member 15 in facing relation to perforated panel 12 and a closure member 16 in facing relation to the perforated bottom 4 constituting the second and last gas passage. In FIG. 1, the closure member 15 extends in overlapping relation to the annular sealing element 13,13' to the upper edge of the lateral wall 7.

These closure members 15 and 16 are so arranged as to be withdrawn by a simple manual operation. They may be constructed in any suitable manner with a tear-initiating line and/or tearing strip and/or pulling tab, for example in a barrier material (aluminium-polyethylene complex).

When these closure members have been disengaged (FIGS. 2 and 3), the filtering unit is ready to operate when it is placed in a filtering casing having a gas inlet passage and discharge passage, the filtering unit being maintained in bearing relation against an inner surface of this casing, the sealing element 13, 13' circumscribing said inlet passage.

Figure 7:
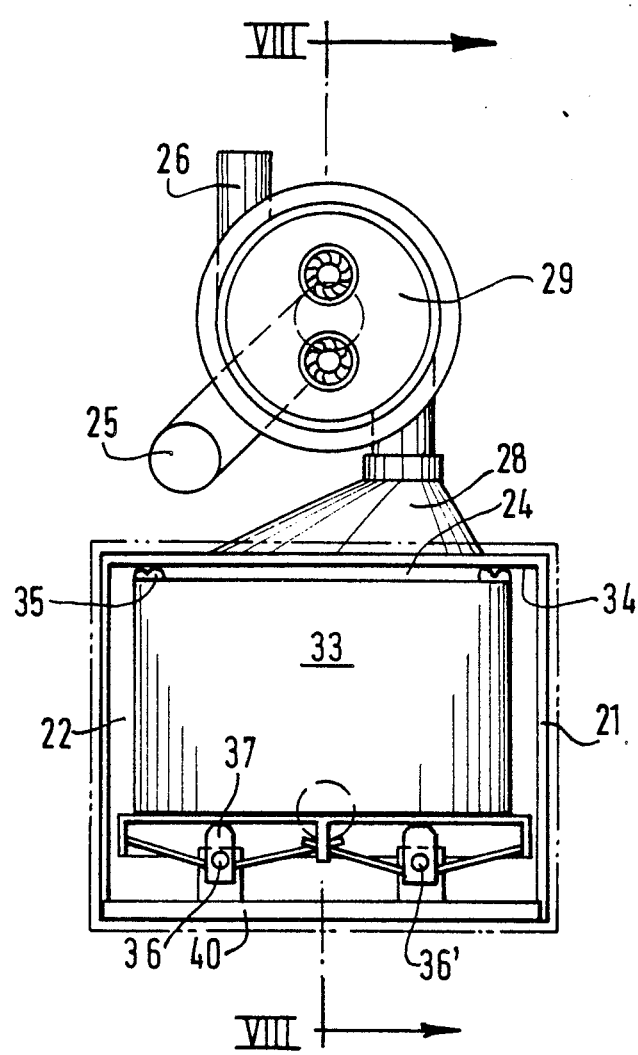
FIGS. 7 and 8 are views of a complete filtering equipment.
Figure 8:
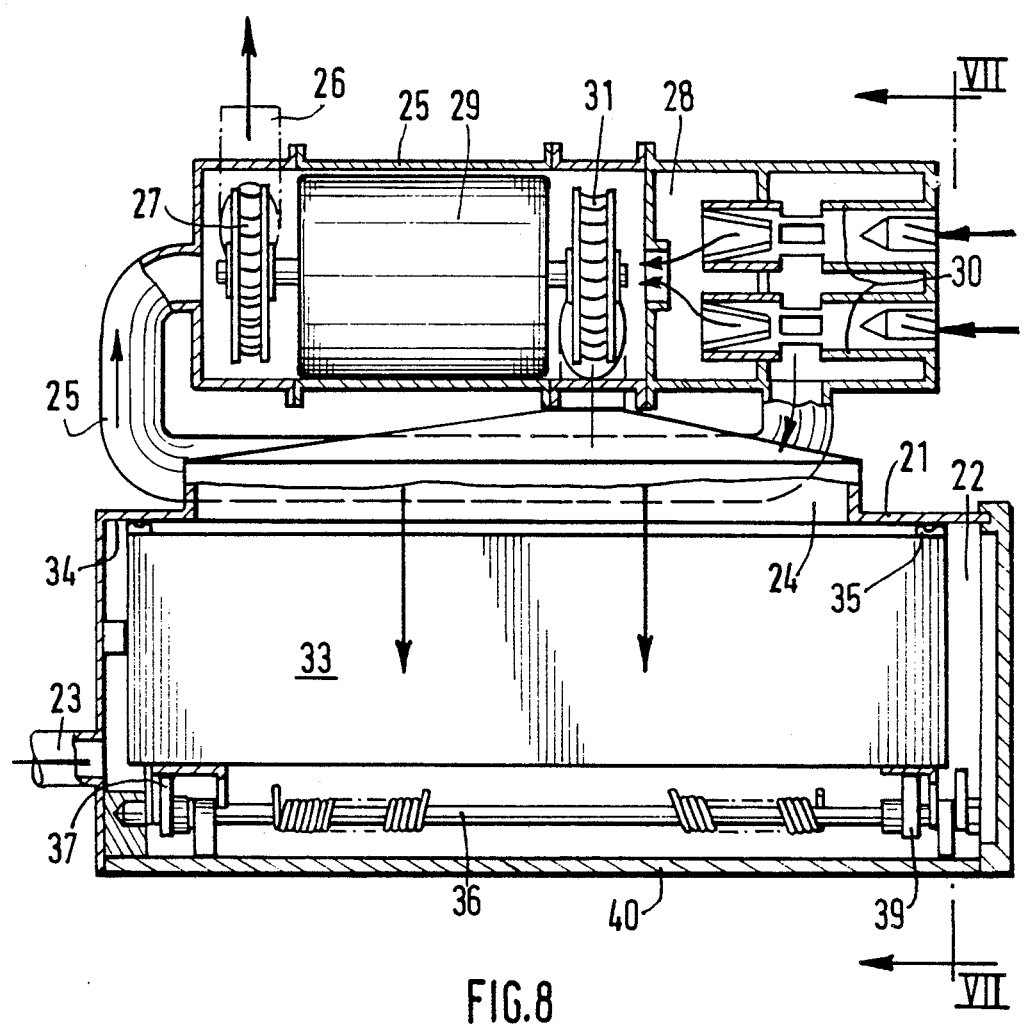

A complete filtering installation will be briefly described with reference to FIGS. 7 and 8.

The installation comprises a casing 21 forming a chamber 22 for a filtering unit 33 with an inlet passage 24 for air to be filtered and a discharge passage 23 for filtered air. The air enters by way of the passage 24, it being propelled by a fan 31, and a separator 28 having cyclones 30 has already removed the coarsest dust from this air, the dust being withdrawn from the separator 28 and rejected to the atmosphere at 26 via the pipe 25 under the effect of the fan 27 mounted on the shaft of the motor 29 which also carries the fan 31. The filtering unit 33 is here shown to bear against the upper surface of the casing 21 through the sealing element 35 under the locking effect of cams 37, 39 of which two are carried by a shaft at 36 and two are carried by a shaft 36'. It will be observed that the cams 37, 39 have a single thrust position.

It will be understood that the filtering unit 33 is here previously provided with its two sealing members. In the event of an alert, it is sufficient for the operator to rapidly withdraw the filtering unit from the casing 21 through a trap door or other opening, manually disengage the sealing closure members, and place the filtering unit 33 which is now operative back into position by an identical clamping by means of the cam system.

According to a modification shown in FIG. 5, a filtering unit 60 has a flange 61 defining an inlet passage having a grate 62, the flange 61 being provided with anchoring studs 63 for insertion in recess 66 of a double sealing element 64, 64'. The filtering element is here sealed by closure members of which the closure member 65 extends over and beyond the studs 63.

In FIG. 6, the filtering unit 93 having a grate 92 is equipped with a sealing element 95 on an inwardly extending flange 94 and the sealing closure member 91 extends in such manner as to overlap partly the flange 94 to which it is adhered or welded, but within sealing element 95 which it does not overlap. The sealing element itself may be placed permanently in its position and periodical maintenance inspections will be carried out, or it may be placed in a separate cover as shown in 67 in FIG. 5 with, as the case may be, a protective gaseous atmosphere, as may be the case of the filter proper.

The invention is mainly applicable to the safeguard of human life in confined compartments by ventilation with decontaminated air.

We claim:

1. Filtering unit for incorporation in a filtering casing having walls, said unit comprising a housing having walls, and, within the housing, an anit-aerosol first filtering stage, a second filtering state, the first filtering stage being superposed on the second filtering stage, an inlet passage for gas to be filtered on an upstream side of the first filtering stage and a discharge passage for filtered gas on a downstream side of the second filtering stage relative to flow of air through the filtering unit, one of said passages having peripheral sealed junction means secured to said unit, for cooperation with a wall of the casing, and discrete first and second manually disengageable sealed impervious films individually peripherally sealingly adhered to the walls of the housing for closing the inlet and discharge passages, respectively, of the filtering unit.

2. Filtering unit according to claim 1, wherein the anti-aerosol filtering stage comprises filter paper.

3. Filtering unit according to claim 1, wherein the second filtering stage comprises activated charcoal.

4. Filtering unit according to claim 1, wherein the peripheral sealed junction means comprise an annular sealing element of elastic material and the sealed impervious film for the passage associated with said sealing element extends beyond and overlaps the sealing element.

5. Filtering unit according to claim 1, wherein the peripheral sealed junction means comprise an annular sealing element of elastic material and the impervious film of the passage associated with said sealing element extends within without overlapping said annular sealing element.

6. Filtering unit according to claim 1, enclosing a neutral atmosphere.

7. Filtering unit according to claim 6, wherein said neutral atmosphere is nitrogen.

8. Filtering equipment, comprising in combination: a casing having walls, ventilation means associated with the casing, a filtering unit, the casing being adapted to receive the filtering unit, the filtering unit comprising a housing, an inlet passage and a discharge passage, and means secured to said filtering unit for providing a sealed bearing of said filtering unit against an inner surface of a casing wall so as to form an inlet pipe, the casing defining an opening for communication with the discharge passage of the filtering unit, and discrete first and second manually disengageable sealed impervious films individually peripherally sealingly adhered to the walls of the housing closing the inlet and discharge passages, respectively, of the filtering unit.

9. Filtering equipment according to claim 8, further comprising means for locking said filtering unit against an inner surface of a casing wall in a single clamped position.

10. Filtering equipment according to claim 9, wherein the locking means comprise cams having a single active bearing position.

* * * * *